(12) United States Patent
Licht (10) Patent No.: US 8,006,826 B2
(45) Date of Patent: Aug. 30, 2011

(54) STAR WHEEL WITH VACUUM CAPABILITY FOR RETAINING CONVEYED ARTICLES

(75) Inventor: Thomas Anthony Licht, Lafayette, CO (US)

(73) Assignee: Crown Packagin Technology, Inc., Alsip, IL (US)

( * ) Notice: Subject to any disclaimer, the term of this patent is extended or adjusted under 35 U.S.C. 154(b) by 289 days.

(21) Appl. No.: 12/383,662

(22) Filed: Mar. 25, 2009

(65) Prior Publication Data
US 2009/0242357 A1    Oct. 1, 2009

Related U.S. Application Data

(60) Provisional application No. 61/072,303, filed on Mar. 28, 2008.

(51) Int. Cl.
*B65G 17/46* (2006.01)
(52) U.S. Cl. ............ 198/471.1; 198/428; 198/438; 198/689.1
(58) Field of Classification Search .............. 198/428, 198/438, 449, 450, 470.1, 471.1, 478.1, 689.1
See application file for complete search history.

(56) References Cited

U.S. PATENT DOCUMENTS

| | | | |
|---|---|---|---|
| 3,901,373 A * | 8/1975 | Rudzinat | 198/471.1 |
| 4,058,864 A | 11/1977 | Morland | |
| 4,175,417 A | 11/1979 | Vergnani et al. | |
| 4,523,360 A | 6/1985 | Giovanola | |
| 4,549,419 A | 10/1985 | Trost et al. | |
| 4,614,018 A | 9/1986 | Krall | |
| 4,840,266 A * | 6/1989 | Gherardi | 198/471.1 |
| 5,127,511 A * | 7/1992 | Keen et al. | 198/460.1 |
| 5,355,710 A | 10/1994 | Diekhoff | |
| 5,531,312 A | 7/1996 | Dickey | |
| 5,768,931 A | 6/1998 | Gombas | |
| 5,943,928 A | 8/1999 | Oh | |
| 6,200,245 B1 | 3/2001 | Dodo et al. | |
| 6,240,796 B1 | 6/2001 | Yamada | |
| 7,073,365 B2 | 7/2006 | Geho et al. | |
| 7,219,790 B2 | 5/2007 | Lanfranchi | |
| 2002/0066327 A1 | 6/2002 | Nagai et al. | |

(Continued)

FOREIGN PATENT DOCUMENTS

EP    0 118 186 A1    9/1984

(Continued)

*Primary Examiner* — Leslie A Nicholson, III
(74) *Attorney, Agent, or Firm* — Woodcock Washburn LLP (57) ABSTRACT

The invention relates to a star wheel used for transporting articles in an arcuate path. The star wheel is provided with a vacuum apparatus to retain the articles within pockets of the star wheel as the wheel is rotated between a point where the articles are loaded onto the wheel and a point where they are removed. The hub of the star wheel functions as a plenum for low pressure, high flow vacuum, and short openings are provided between the plenum and the pockets. One of the walls of the hub is stationary and, at its periphery, it is positioned closed to but slightly spaced from the rim of the star wheel. A blocking surface is provided within the plenum spaced with a small gap from the inner end of some, but not all, of the short openings, so that vacuum is blocked from some positions of the pockets as they rotate. The apparatus avoids wear and friction, is able to transport irregular shaped articles, and is less costly to manufacture and use.

13 Claims, 7 Drawing Sheets

U.S. PATENT DOCUMENTS

| | | |
|---|---|---|
| 2006/0101889 A1 | 5/2006 | Schill et al. |
| 2006/0104745 A1 | 5/2006 | Schill et al. |
| 2008/0034823 A1 | 2/2008 | Frattini et al. |
| 2008/0148801 A1 | 6/2008 | Olson et al. |

FOREIGN PATENT DOCUMENTS

| | | |
|---|---|---|
| EP | 0 275 369 B1 | 5/1992 |
| EP | 1 214 991 B1 | 2/2005 |
| WO | WO 99/65646 A1 | 12/1999 |

* cited by examiner

STAR WHEEL WITH VACUUM CAPABILITY FOR RETAINING CONVEYED ARTICLES

CROSS-REFERENCE TO RELATED APPLICATION

This application claims the priority right of application Ser. No. 61/072,303, filed Mar. 28, 2008 by applicant herein.

BACKGROUND OF THE INVENTION

(1) Field of the Invention

This invention relates to apparatus for conveying or transporting articles during manufacturing processes, particularly during the manufacture of metal container bodies. More particularly, the invention relates to so-called star wheels that convey such articles in an arcuate path from one point to another.

(2) Description of the Related Art

Star wheels provide one way of conveying articles around an arcuate path and they are used extensively in equipment designed for manufacturing various items, particularly metal container bodies for beverage containers or the like. Star wheels are rotatable wheel-like transporting devices provided with a number of semi-cylindrical pockets around the wheel periphery. Each pocket holds an individual article and conveys it, as the wheel turns, from a feed point where the articles are loaded onto the wheel, to a discharge point where the articles are released.

In order to hold the articles firmly in the pockets during rotation of the wheel to counteract the effects of gravity and centrifugal force, such wheels may be provided with a vacuum system to hold the articles temporarily in place by means of negative air pressure generated between the article and the surrounding surface of the pocket. The vacuum is generally applied as a pocket passes the loading point and released as the pocket passes the discharge point to facilitate removal of the articles from the pockets.

An example of a star wheel of this kind is disclosed in U.S. Pat. No. 5,531,312 which issued to Daniel M. Dickey on Jul. 2, 1996. In this device, vacuum is applied to one or more holes in the peripheral pockets. There is a stationary "valve" connected to a vacuum pump and the "valve" delivers the vacuum to the interior of the wheel. To ensure that there is no loss of vacuum between the valve and the wheel, a spring forces the valve against the wheel. The spring is required to apply a sufficient amount of force so that a reasonably good vacuum seal is provided, but this creates friction and wear and also increases energy costs for operating the apparatus.

Another example of a star wheel of this kind is disclosed in U.S. Pat. No. 7,219,790 which issued to Lino Lanfranchi on May 22, 2007. The device disclosed in this reference is somewhat similar to that of the Dicky patent mentioned above in that a wheel holding the articles rotates adjacent to a stationary plenum to which a vacuum source is connected. Again, friction, wear and high cost of operation are likely to result from this design.

There is therefore a need for a star wheel of this kind that may be operated more efficiently.

SUMMARY OF THE INVENTION

An exemplary embodiment provides a hub for a star wheel intended for transporting articles in an arcuate path. The hub has a rim having an inner surface and an outer surface, the outer surface being adapted to receive a holder comprising a plurality of pockets, each pocket being shaped to receive an article intended for transport and provided with a vacuum opening for vacuum retention of the article. The hub also has a pair of sidewalls at each side of the hub, one of the sidewalls being attached to the rim and rotatable therewith and another of the sidewalls being unattached to the rim and fixable against rotation. The plenum within the hub is defined by the rim and the pair of sidewalls, the rim having a plurality of circumferential openings interconnecting the plenum and the exterior surface of the rim at positions adapted to be in registry with the vacuum openings. A rotatable shaft is fixed to the one of the sidewalls for rotation of the one of the sidewalls and the rim. A port is provided in communication with the plenum and adapted for connection to a vacuum source for generation of a vacuum within the plenum. A blocking surface is provided within the plenum positioned adjacent to, but out of contact with, the inner surface of the rim. The blocking surface partially blocks at least one but not all of the openings at the inner surface of said rim. The other sidewall at its periphery is spaced from the rim to form a gap effective to avoid contact with the rim while preventing substantial (i.e. undue or significant) loss of vacuum from the plenum.

By "preventing substantial loss of vacuum" we mean that there is insufficient loss of vacuum in use to interfere with the desired secure retention of articles in the pockets connected to the plenum via the unblocked openings in the rim.

Another exemplary embodiment provides a star wheel having a hub as described above and an attached holder provided with pockets for the articles to be transported.

Yet another exemplary embodiment provides an apparatus for conveying generally cylindrical articles in an arcuate path comprising a rotatable star wheel as described above and a vacuum-generating device, the vacuum-generating device being connected to the port of the hub to thereby generate vacuum within the plenum.

The exemplary embodiments are particularly suitable for use with irregularly shaped articles to be transported, e.g. container bodies, because of the use of low vacuum and high air flow helps to keep the articles in the pockets even if a tight seal is not formed between the article and the inner surface of the pockets. When using high vacuum and low air flow systems, as in the prior art, irregular containers can break the vacuum within the pockets, resulting in loss of the article from the pocket because the holding force only operates over a short distance in such systems.

The exemplary embodiments make it possible to use relatively inexpensive and cost-effective low vacuum apparatus while improving the ability of the apparatus to hold and transport irregularly shaped articles.

DETAILED DESCRIPTION OF THE EXEMPLARY EMBODIMENTS

Figure 1:
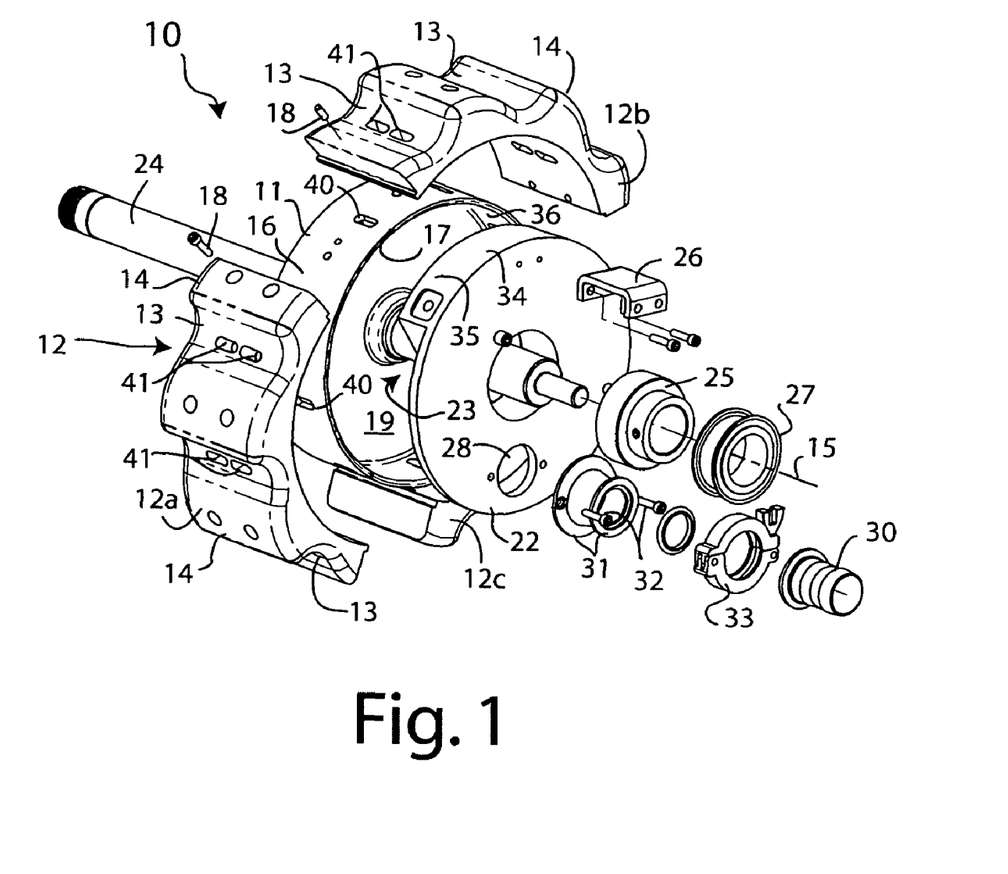
FIG. 1 is an exploded diagram showing one exemplary embodiment of the present invention.
Figure 2:
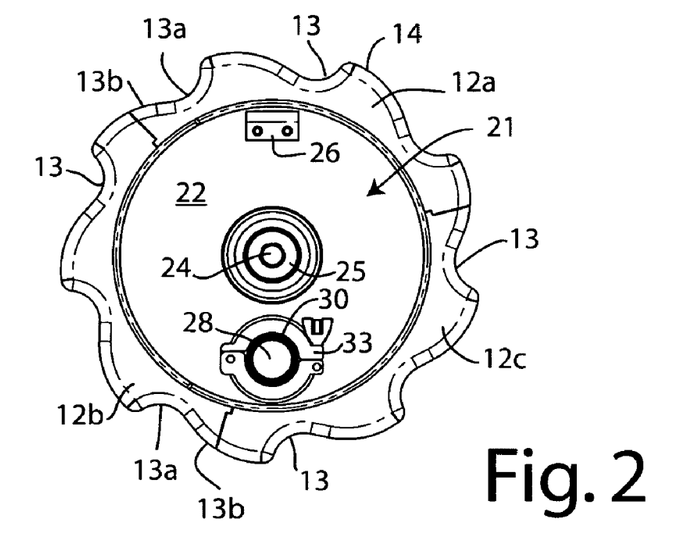
FIG. 2 is an elevational view of one side of the assembled embodiment of FIG. 1.

One exemplary embodiment of the present invention is shown in FIGS. 1 to 5 of the accompanying drawings. FIG. 1 shows the various parts of the embodiment in an exploded view that reveals the interior elements. Illustrated in these drawings is a star wheel 10 suitable for conveying or transporting articles, particularly beverage container bodies 20 (FIG. 4) in an arcuate path represented by arrow A. The star wheel includes a hub 11 onto which is attached a peripheral article holder 12 in this case made up of three separate parts 12A, 12B and 12C. The separate parts 12A, 12B and 12C of the holder are fixed to an outer surface 16 of a rim 17 of the hub 11 by means of screws 18. The holder 12 has a number of pockets 13 (in this case nine) arranged circumferentially around the otherwise cylindrical outer surface 14 of the holder. The fact that the holder 12 is removable means that it can be replaced by a different holder having different pocket designs as the demands of the equipment change, e.g. precisely hemi-cylindrical pockets, larger pockets for container bodies of larger size, or longer pockets due to difference of width of the holder. It is also possible to change the number of pockets in the holder 12, provided that corresponding openings in the rim are available or are introduced, e.g. by drilling, as will be apparent later. The pockets 13 are depressions or recesses in the outer surface 14 each shaped and dimensioned to partially receive a single container body 20 and they are substantially identical and equally spaced from each other, having longitudinal axes that are parallel to an axis of rotation 15 of the star wheel. The illustrated pockets include a part-cylindrical region 13a and a convex ramped region 13b (FIG. 2). This shape is preferred when the star wheel is used as an infeed wheel which receives container bodies in a single lane from a gravity track. Part of the function of such a star wheel is to space the container bodies to match the pitch of a main star wheel of a container body shaping apparatus (not shown). On the other hand, when the star wheel is used as a transfer wheel merely to transfer container bodies from one treatment wheel to another, the pockets are more preferably symmetrical and are substantially hemi-cylindrical depressions in the outer surface 14 of the holder 12.

The hub 11 includes a rim 17 and a first (rotational) side wall 19. Both the rim 17 and the first sidewall 19 rotate as the hub 11 rotates. A second side wall 22 of the hub does not rotate with the rim 17 and first side wall 19 and may be held stationary. The rotatable sidewall 19, the rim 17 and the stationary sidewall 22 together define a hollow drum-like body 21 enclosing an interior plenum 23. A shaft 24 passes completely through the drum-like body at its center and is fixed to the first sidewall 19 so that rotation of the shaft causes rotation of the first sidewall 19, the integral rim 17 and the holder 12 attached to the rim. However, the second sidewall 22 incorporates a central bearing 25 that surrounds the shaft 24 and allows the second sidewall 22 to remain stationary as the shaft rotates. The bearing 25 is a sealed bearing that prevents air leakage at this point and preferably incorporates ball bearings for low friction and precision of rotation, although another kind of bearing may be used instead, e.g. a sliding bearing or a bearing incorporating needle rollers, etc. The second (stationary) sidewall 22 also has a projecting bracket 26 that allows the sidewall to be fixed to a stationary object, such as an adjacent part of machinery used for shaping or conveying beverage container bodies, thereby preventing its rotation with the shaft 24 and helping to center the stationary plate 22 relative to the rim 17 of the hub. If the bracket can be attached at alternative positions on the adjacent machinery, it is possible to rotate the stationary sidewall about the shaft 24 before the bracket 26 is secured in place, thereby allowing the star wheel to be set up in different ways before use. This allows the articles transported by the star wheel to be fed onto the wheel are removed from it at different positions around the wheel, if desired, as will be more apparent later.

Figure 3:
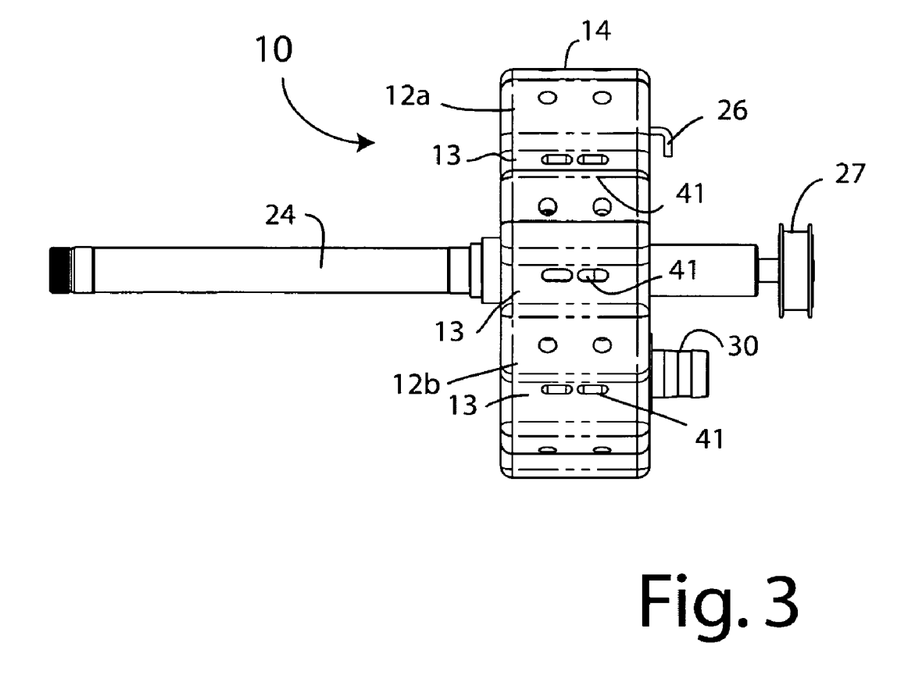
FIG. 3 is an elevational view of one end of the assembled embodiment of FIG. 1.
Figure 6:
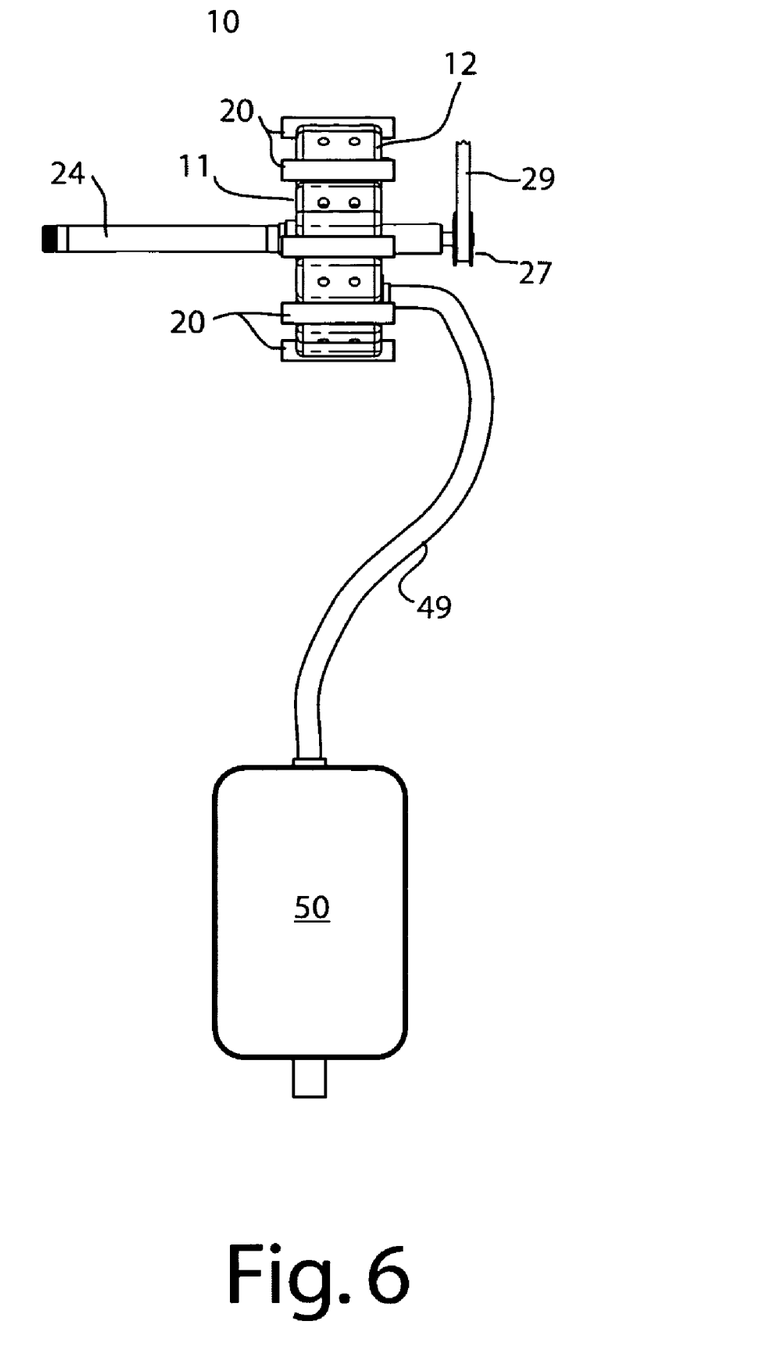
FIG. 6 shows a star wheel of the earlier figures with an associated vacuum generating apparatus and carrying container bodies.

As shown in FIGS. 1, 3 and 6, after passing through the hub, the shaft 24 terminates with a pulley 27 shaped to receive part of a driven flexible belt 29 (FIG. 6) used for rotating the shaft at a desired speed in a desired direction. Alternatively, the shaft 24 may be driven by a direct drive or servo drive device (not shown) if greater precision and control of movement are required. The stationary sidewall 22 also has a vacuum port 28 provided with a nozzle 30 attached to the sidewall 22 by means of washers 31, screws 32 and an encircling clamp 33. The nozzle 30 has a group of encircling ribs so that it grips an inner surface of a hose 49 (see FIG. 6) of a vacuum-producing device 50 or, alternatively, any one of a number of commercially available hose clamps may be used to attach the hose to the nozzle, e.g. a worm clamp or spring clamp, etc.

Figure 4:
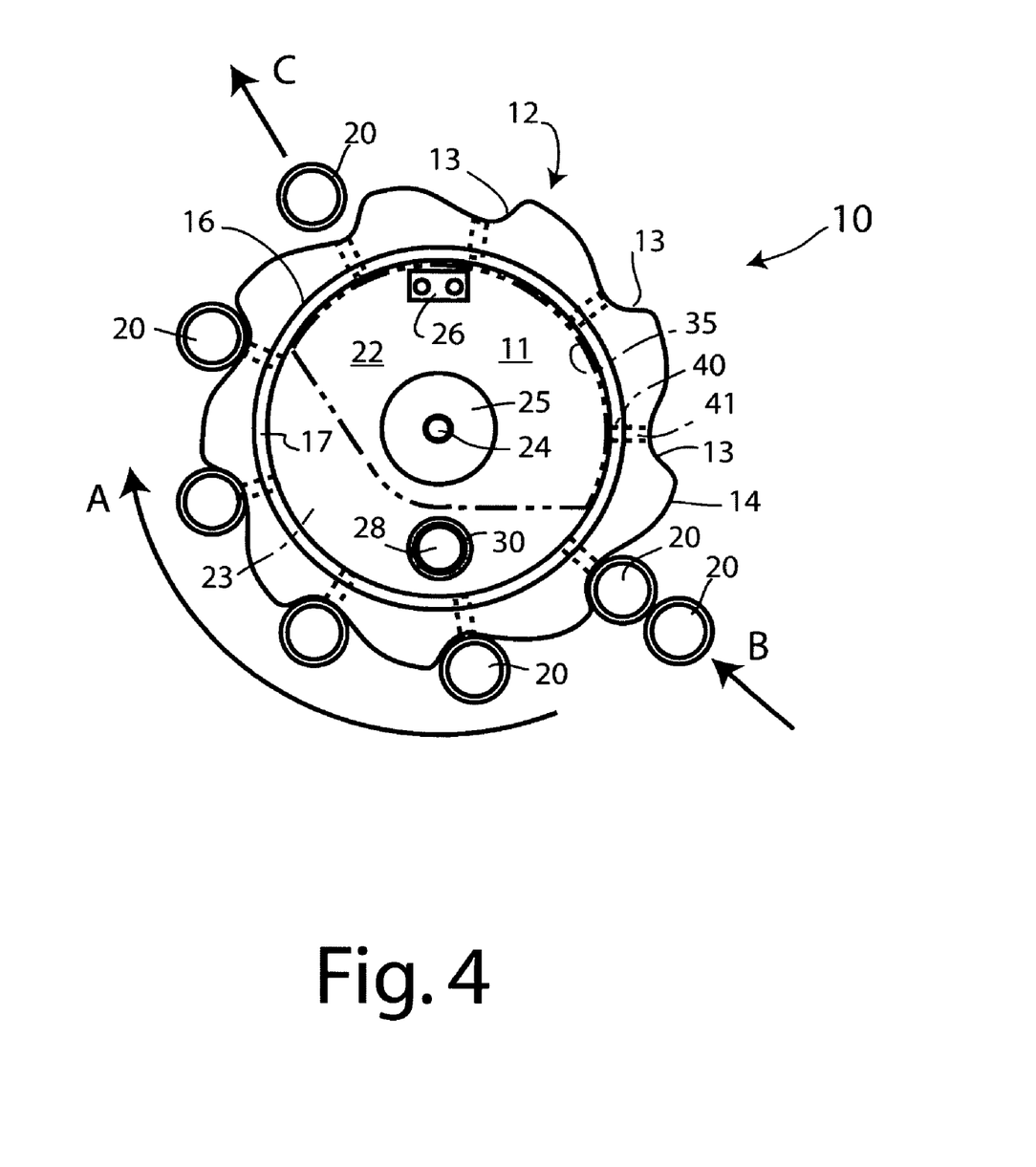
FIG. 4 is a view similar to FIG. 2 but somewhat simplified and showing interior parts of the embodiment in broken lines and including container bodies in certain pockets.
Figure 5:
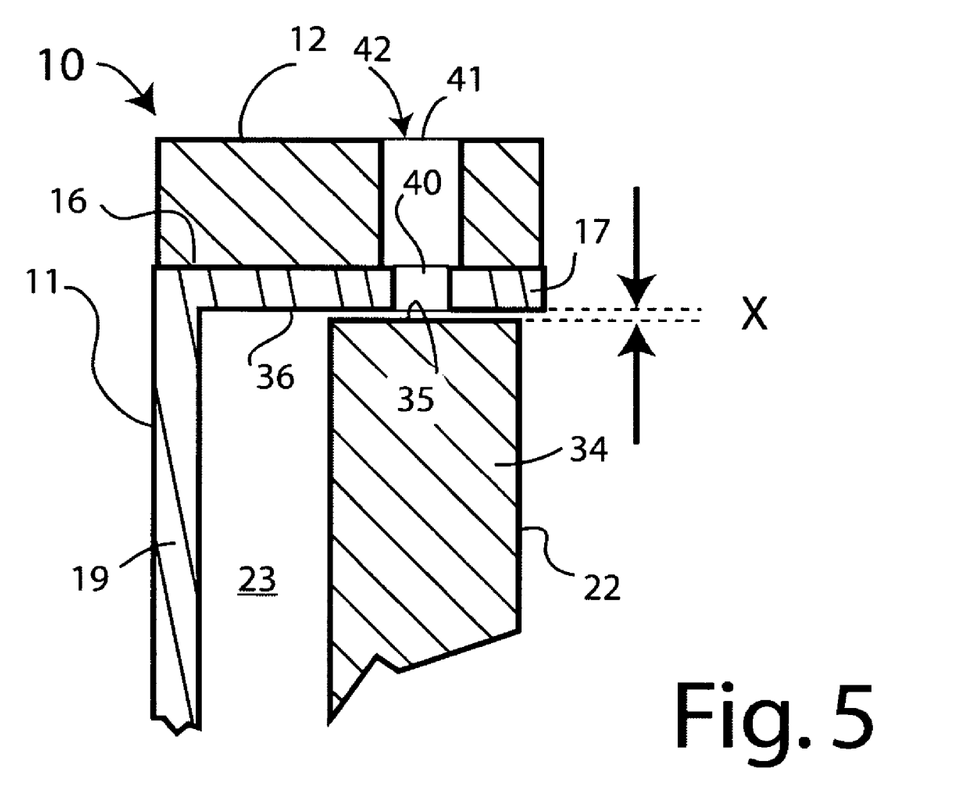
FIG. 5 is a partial cross-section of the rim and associated second sidewall and blocking surface of the embodiment of FIG. 1.
Figure 9:
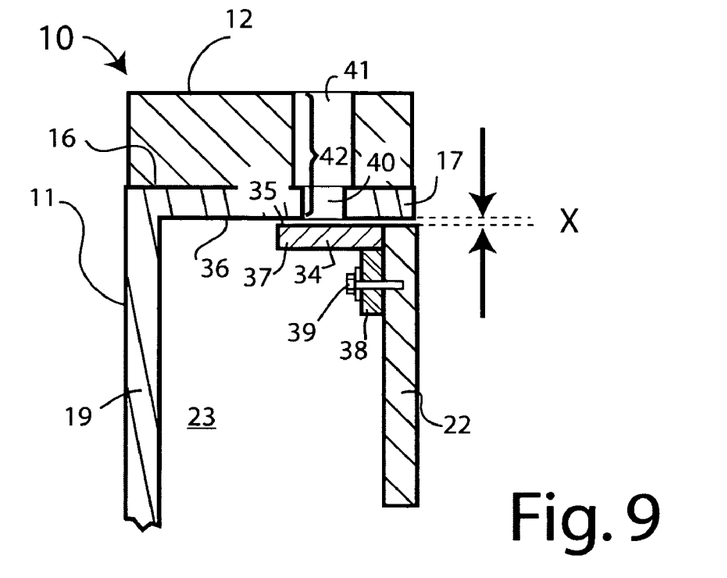
FIG. 9 is another partial cross-sectional view similar to that of FIG. 5 showing a still further modification.

As best seen from FIGS. 1 and 5, the apparatus includes a blocking surface 35 within the interior of the hub 11 adjacent to, but slightly spaced from, an inner surface 36 of the rim 17. The blocking surface does not extend fully around the periphery of the inner surface of the rim and it remains stationary as the hub rotates. The surface 35 is part of a blocking element 34 that may take one of several forms. In the illustrated embodiments of FIGS. 1 to 5, it forms an integral part of the stationary sidewall 22 that extends into the plenum. This part of the sidewall is considerably thicker (in the axial direction) than the remainder and thus forms a projection that extends diametrically from the periphery of sidewall 22 to a point just beyond the central bearing 25 (FIG. 4). The projection thus occupies an approximate sector of the circle formed by the periphery of the stationary sidewall 22. However, the projection does not extend completely to the opposite rotational sidewall 19, thereby leaving a gap forming part of the plenum 23 (FIG. 5). Alternatively, as shown in FIG. 9, the blocking element 34 may be thin curved plate 37 attached to the periphery of the stationary side wall 22, e.g. by bracket 38 and bolts 39, and extending into the plenum. Of course, the curved plate extends only partially around the periphery of the sidewall 22 and the sidewall 22 is made sufficiently structurally rigid that it does not flex when the vacuum is generated within the plenum. As a further alternative, the curved plate 37 may be integral with the sidewall 22, but when it is releasably attached to the sidewall, as shown in FIG. 9, the curved plate may be moved to different positions around the hub 11 or replaced by a similar curved plate extending a greater or lesser distance around the periphery of the hub. This allows the feed and discharge positions of the star wheel to be varied, as will be more apparent later. As a still further alternative, the curved plate may be made adjustable in its total circumferential length so that it can be adjusted to block fewer or more pockets, as desired, e.g. when setting up the apparatus for different uses. This may be achieved, for example, by making the curved plate out of a thin and relatively flexible material, splitting the curved plate into two parts and allowing the parts to slide over/under each other where they meet at the center so that the ends of the curved plate may be moved in or out with respect to each other.

The rim 17 of the hub 11 has a series of openings 40 extending from the inner surface 36 of the rim to the outer surface 16. These openings correspond in position to the pockets 13 in the holder 12 and they align with corresponding openings 41 in the holder 12 to form passages 42 extending between the pockets and the plenum 23 in the hub. Each pocket 13 of the holder is provided with at least one opening 41 at its innermost part of the pocket, but there may be more than one.

As shown most clearly in FIG. 4, the star wheel 10 is rotated around path A and vacuum is applied at port 28. Container bodies 20 are received and held within the pockets 13, but only in those pockets where openings 40 do not confront the blocking surface 35 adjacent to the interior surface 36 of the rim, and thus remain unblocked. The purpose of the blocking surface 35 is to block, or severely restrict, airflow from the pockets 13 to the plenum 23 via passages 42. For those openings 40 that are blocked by blocking surface 35, there is insufficient airflow or vacuum generated at the corresponding pocket to hold a container body against removal by gravity, centrifugal force or by direct mechanical extraction (i.e. by a similar star wheel or conveyor provided with its own vacuum holding arrangement). Thus, container bodies 20 may be fed to and loaded on the star wheel at a feed point 43 from a direction B via a suitable delivery device, conveyed around the wheel along path A and then released at a discharge point 44 to move away in direction C. As the container bodies are transported in this manner, they are firmly held in the pockets 13 by a low pressure vacuum applied via passages 42. As the hub 11 rotates, and as the rim 17 circles around the blocking surface 35, each passages 42 leading to a pockets will be blocked by blocking surface 35 for part of its circular path of travel, and will then be unblocked for the remainder of its circular path. Container bodies can thus be retained in a pocket for the part of the path where the passage 42 is unblocked, and may be removed from the pocket when the passage is blocked and the vacuum is effectively shut off. It will be appreciated that, during apparatus set-up, rotation of blocking element 34 (together with stationary sidewall 22, if integral) changes the locations of the feed and discharge positions around the wheel, and this can also be achieved by changing the circumferential extent of the blocking element or exchanging it for a blocking element of different circumferential extent. The star wheel can thus be modified for different purposes.

As noted earlier, and as shown most clearly in FIG. 5, the blocking surface 35 and the stationary sidewall 22 do not contact the inner surface 36 of the rim 17 but are spaced from the rim by small gap "X". Of course, the distance of separation of the blocking surface 35 from the inner surface and that of the periphery of the sidewall 22 may be slightly different, but they are generally the same, as shown. The gap X enables the star wheel to operate without generating friction between the stationary sidewall 22, the blocking surface and the rim. However, this arrangement allows air to enter the plenum 23 directly from the outside through the gap X. Air may also enter the plenum from the pockets via the passages 42. When the openings 40 are blocked by blocking surface 35, air may still enter through the passages 42 and through the gap between the inner surface 36 of the rim 17 and the blocking surface 35. When the openings 40 are unblocked, the pockets are normally occupied by an article being transported, so a limited amount of air passes through the passages 42. If too much air flows into the plenum from the blocked pockets via gap X, it may be difficult to remove a container from its pocket when the pocket moves to a position where the opening 40 is blocked because the container body will still be held by the (somewhat diminished) air flow through the passage 42. It is therefore most desirable to minimize the amount of air flow from the blocked pockets, as well as the amount of air flowing directly through the gap X from the outside. Both these air flows can be reduced by decreasing the size of the gap X. However, as the gap X is made smaller, there comes a point at which the high degree of precision of manufacture of the parts and the accuracy of rotation around the central axis 15 (necessary to avoid contact of the stationary sidewall 22 and the rim 17) introduces substantial costs into the manufacture of the apparatus, so there is a practical lower limit to the size of the gap X depending on manufacturing techniques employed and costs considered acceptable. In many cases, the practical lower limit of the gap X is about 0.002 inch. However, depending on the size of a star wheel and the applied vacuum, the size of gap X may fall within the range of 0.002 to 0.010 inch without causing undue difficulties. Nevertheless, smaller or larger gaps (e.g. 0.015 inch) may be suitable in appropriate cases. As the gap X is made larger, the vacuum apparatus can be run faster to remove the inflow of air and maintain a suitable vacuum, but the problem of insufficient vacuum shut-off for the blocked pockets presents a practical upper limit to the size of gap X.

The design of the exemplary embodiments allows them to be operated with low vacuum and high airflow because narrow and/or long and/or convoluted passages that act to constrict the flow of air are avoided. The vacuum port 28 may be made as wide as required for unrestricted airflow from the plenum, the plenum 23 itself may be made large enough that there is minimal turbulence and resistance to airflow generated inside the plenum during use, and the passages 42 may be made quite short (because they are only required to pass through a relatively thin rim 17 and holder 12) and may be made as wide as desired to avoid constriction and, indeed, each pocket may be provided with more than one such passage. In general, the length of the passages 42 and their cross-sectional area (or combined cross-sectional area if there is more than one such passage per pocket) are made such that, at the operational vacuum within the plenum (usually at least 10 inches of water column), the air flow through the passages 42 creates a capture velocity that draws a container body into the pockets from quite a distance away. The quantity of air drawn in is also such that it can accommodate leakage caused by irregular or incompletely conforming container body shapes that do not exactly match the pocket shape, and such that it will hold a container body in the pocket with sufficient force to recapture the container body should it start to fall out of the pocket. The combined length of the passages 42 (a combination of the openings 40, 41) is preferably no more than about 2 inches for most embodiments, and is more preferably less than about one inch. The diameter of the passage may be half an inch to one inch or more, preferably with a countersink at the outer end (i.e. within the pocket). The passage 42 may be elongated laterally to form a slot (if desired) and, as noted above, there may be more than one passage per pocket. The optimum length, shape, cross-sectional area, number and placement of the passages 42 may be optimized for any particular application, bearing in mind the need to provide a suitable retaining force for the container bodies while avoiding undue loss of vacuum from the plenum and insufficient vacuum shut-off at the blocked pockets.

The exemplary embodiments may be employed with a high volume, low pressure vacuum-generating apparatus 50 as shown in FIG. 6, e.g. a vacuum fan or regenerative blower. For example, the vacuum generated by the apparatus 50 may be approximately 10 inches of water column (about 0.36 pounds per square inch of vacuum) or more at a high flow rate compared to 15 or more inches of mercury (7.4 pounds per square inch of vacuum) required for conventional apparatus (1 inch of water column corresponds to 0.03613 pounds per square inch of pressure, and 1 inch of mercury corresponds to 0.4912 pounds per square inch). The minimum acceptable vacuum will depend on various factors, such as the weight and shape of the containers, as well as the rotational force imparted during transfer. For a light-weight straight walled container body 20, rotating at relatively slow speeds, the vacuum may be as low as 5 to 6 inches of water column. For an irregularly shaped aluminum container body, a half-inch diameter passage 42 and a vacuum pressure of about 10 inches of water column usually provides sufficient holding force at normal rotational speeds. Higher vacuums improve the holding effect, but are probably a waste of energy above about 20 inches of water column. At such relatively low levels of vacuum, the vacuum apparatus 50 may employ centrifugal fans or regenerative blowers (in which the fan wheel is preferably a radial blade fan), which are relatively inexpensive forms of apparatus to manufacture and use. Suitable vacuum-generating apparatus of this kind may be obtained, for example, from The New York Blower Company, of 7660 Quincy St., Willowbrook, Ill., U.S.A., 60527. Compared to high vacuum vane or piston style pumps (that often additionally require cooling apparatus) considered necessary in many prior art designs, these low vacuum devices are much more cost effective and involve lower maintenance and repair.

The air leakage via blocked openings 40 can be expressed in terms of percentage flow area relative to the opening being blocked. Table 1 below provides percentage leakage rates for gaps X of various dimensions. Leakage rates of 10% or less are considered desirable, so it can be seen from the table that gaps of up to 0.010 inch are preferred. A most preferred operating range is, in fact, 0.005 to 0.010 inches. Higher leakage rates make it more difficult to release the article from the blocked pockets 13, as explained above.

TABLE 1

| Gap (inches) | % Leakage |
| --- | --- |
| 0.002 | 1.6 |
| 0.005 | 3.9 |
| 0.010 | 7.8 |
| 0.020 | 16.1 |
| 0.030 | 24.2 |
| 0.040 | 32.2 |

Figure 7:
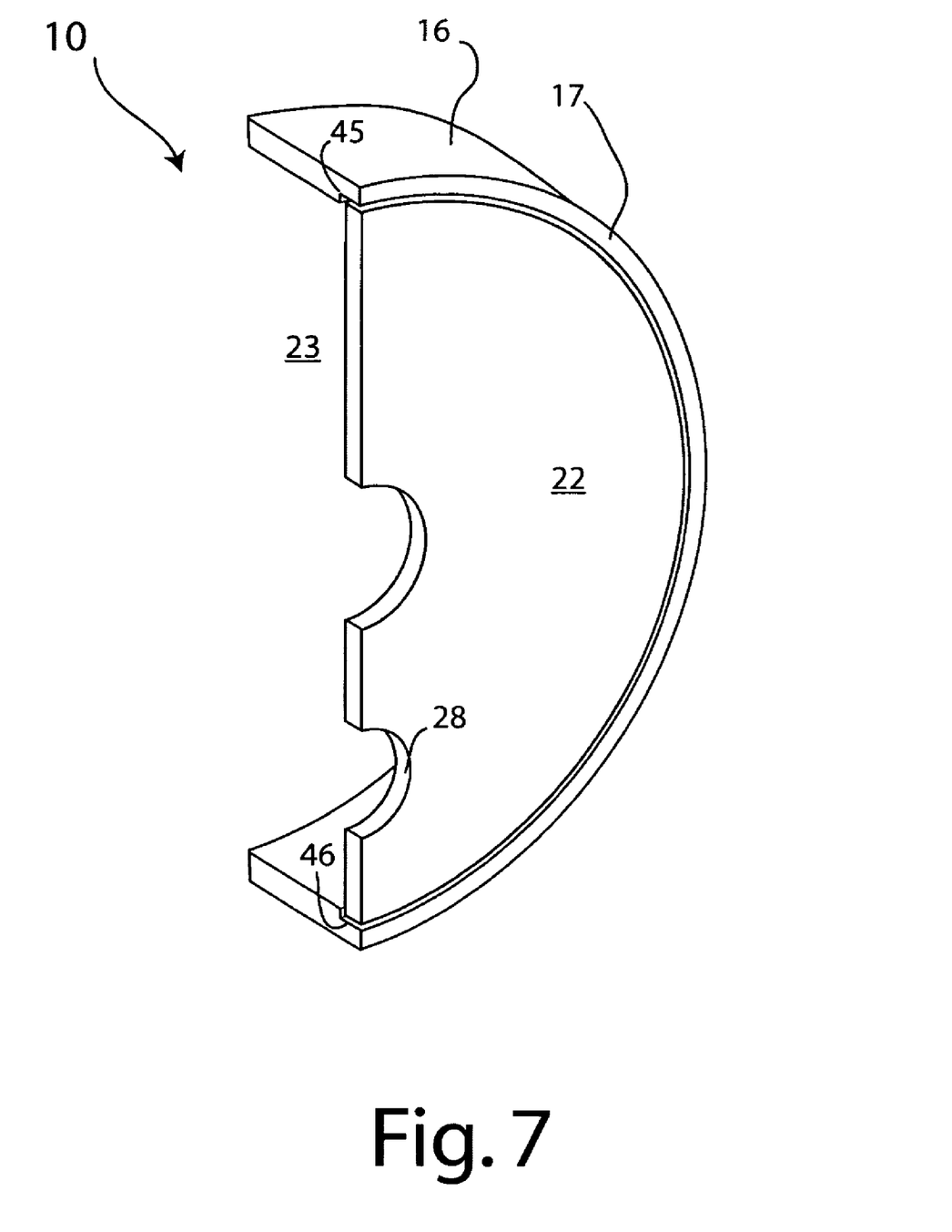
FIG. 7 is a perspective cut-away view of part of the apparatus similar to that of the previous figures but showing an alternative arrangement at the periphery of the second sidewall.
Figure 8:
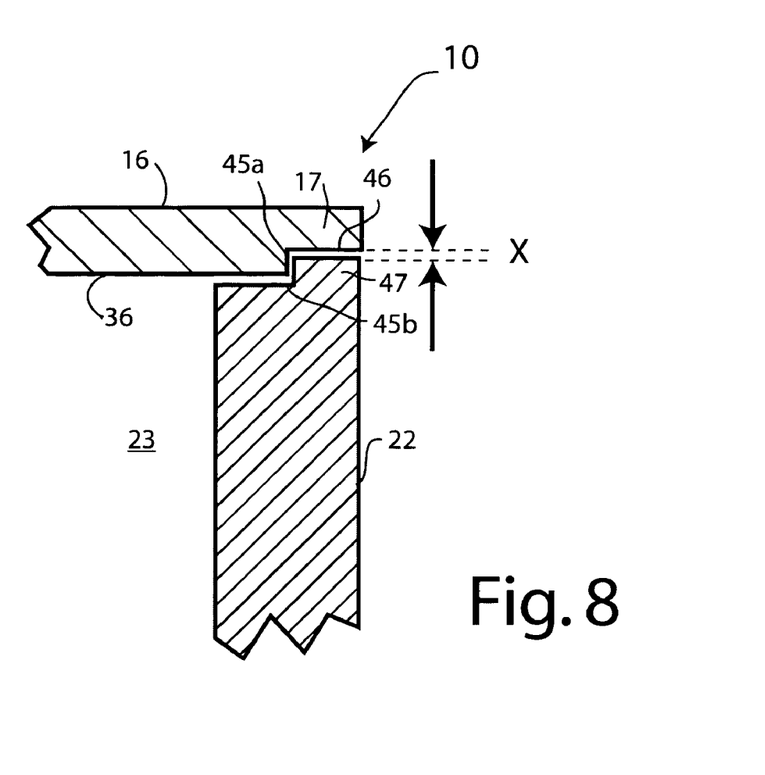
FIG. 8 is a partial cross-sectional view similar to that of FIG. 5 of a further modification.

As for the air leakage between the perimeter of the stationary sidewall 22 of the apparatus and the annular rim 17 via gap X, this leakage zone is shown in FIG. 5, but alternative arrangement are shown in FIGS. 7 and FIG. 8. In the arrangement of FIG. 5, the amount of leakage is proportional to the size of gap X and the diameter of the plenum 23. The gap X may be as little as 0.002 inch but should preferably not exceed about 0.010 inch for practical operations. In a working model having a 10 inch diameter plenum 23, the following leakage for various gaps was observed as shown in Table 2.

TABLE 2

| Gap (inches) | % Leakage |
| --- | --- |
| 0.002 | 6.1 |
| 0.005 | 15.3 |
| 0.010 | 30.6 |

However, leakage can be further reduced (and thus the gap X made larger) by incorporating a right angle bend 45 into the gap X as shown in FIG. 7 by providing a peripheral groove 46 in the rim 17 into which the periphery of the stationary sidewall 22 extends. This arrangement gives the gap an "L-shaped" flow path between the exterior and the plenum. Leakage can be reduced even further by incorporating two right angle bends 45a and 45b into the gap X as shown in FIG. 8. This is achieved by making groove 46 thinner than the second sidewall 22 and providing a corresponding projection 47 at the periphery of the sidewall 22. This arrangement gives the gap a "Z-shaped" flow path between the exterior and the plenum. Such convoluted paths slow the rate of air leakage due to the turbulence created at the sharp bends in the flow direction. For example, the "Z-shaped" path of FIG. 8 may reduce the flow rate by 60% compared to the direct path of FIG. 5.

The invention claimed is:

1. A hub for a star wheel intended for transporting articles in an arcuate path, said hub comprising:
    a rim having an inner surface and an outer surface, said outer surface being adapted to receive a holder comprising a plurality of pockets, each pocket being shaped to receive an article intended for transport and provided with a vacuum opening for vacuum retention of said article;
    a pair of sidewalls at each side of said hub, one of said sidewalls being attached to said rim and rotatable therewith and an other of said sidewalls being unattached to said rim and fixable against rotation;
    a plenum within said hub defined by said rim and said pair of sidewalls, said rim having a plurality of circumferential openings interconnecting said plenum and said exterior surface of said rim at positions adapted to be in registry with said vacuum openings;
    a rotatable shaft fixed to said one of said sidewalls for rotation of said one of said sidewalls and said rim;
    a port in communication with said plenum and adapted for connection to a vacuum-generating apparatus for generation of a vacuum within said plenum; and
    a blocking surface within said plenum positioned adjacent to, but spaced at a distance from, the inner surface of the rim, said blocking surface partially blocking at least one but not all of said openings at said inner surface of said rim;
    wherein said other sidewall at a periphery thereof is spaced from said rim to form a gap effective to avoid contact with said rim while preventing substantial loss of vacuum from said plenum.

2. The hub of claim 1, wherein blocking surface is integral with said other sidewall, forming a part of a projection from said other sidewall extending into said plenum.

3. The hub of claim 1, wherein the blocking surface is a surface of an element attached to, but separable from, said other sidewall.

4. The hub of claim 1, wherein said other sidewall has a central airtight bearing and said shaft extends through said bearing to emerge from said hub.

5. The hub of claim 1, wherein said gap has a width in a range of 0.002 to 0.015 inch.

6. The hub of claim 1, wherein said distance is in a range of 0.002 to 0.015 inch.

7. The hub of claim 1, wherein said circumferential gap includes at least one bend between said exterior and said plenum of the hub created by cooperating shapes of confronting parts of said rim and said other sidewall.

8. The hub of claim 1, wherein said vacuum port, said plenum, said distance, said gap and said circumferential openings are dimensioned to allow said vacuum generated within said plenum during use to operate at a pressure of about 20 inches of water column or less at flow volumes sufficient to capture and hold an article in said pocket.

9. A rotatable star wheel comprising a holder further comprising a plurality of shaped pockets, each pocket being shaped to receive an article intended for transport and provided with a vacuum opening for vacuum retention of said article; and     a hub for a star wheel intended for transporting articles in an arcuate path, said hub comprising:

a rim having an inner surface and an outer surface, said outer surface being adapted to receive the holder;

a pair of sidewalls at each side of said hub, one of said sidewalls being attached to said rim and rotatable therewith and an other of said sidewalls being unattached to said rim and fixable against rotation;

a plenum within said hub defined by said rim and said pair of sidewalls, said rim having a plurality of circumferential openings interconnecting said plenum and said exterior surface of said rim at positions adapted to be in registry with said vacuum openings;

a rotatable shaft fixed to said one of said sidewalls for rotation of said one of said sidewalls and said rim;

a port in communication with said plenum and adapted for connection to a vacuum-generating apparatus for generation of a vacuum within said plenum; and         a blocking surface within said plenum positioned adjacent to, but spaced at a distance from, the inner surface of the rim, said blocking surface partially blocking at least one but not all of said openings at said inner surface of said rim;

wherein said other sidewall at a periphery thereof is spaced from said rim to form a gap effective to avoid contact with said rim while preventing substantial loss of vacuum from said plenum.

10. The star wheel of claim 9, wherein said shaped pockets are semi-cylindrical and arranged with longitudinal axes parallel to an axis of rotation of the hub.

11. An apparatus for conveying generally cylindrical articles in an arcuate path, said apparatus comprising a vacuum-generating apparatus; and a rotatable star wheel comprising a holder further comprising a plurality of shaped pockets, each pocket being shaped to receive an article intended for transport and provided with a vacuum opening for vacuum retention of said article; and     a hub for a star wheel intended for transporting articles in an arcuate path, said hub comprising:

a rim having an inner surface and an outer surface, said outer surface being adapted to receive the holder;

a pair of sidewalls at each side of said hub, one of said sidewalls being attached to said rim and rotatable therewith and an other of said sidewalls being unattached to said rim and fixable against rotation;

a plenum within said hub defined by said rim and said pair of sidewalls, said rim having a plurality of circumferential openings interconnecting said plenum and said exterior surface of said rim at positions adapted to be in registry with said vacuum openings;

a rotatable shaft fixed to said one of said sidewalls for rotation of said one of said sidewalls and said rim;

a port in communication with said plenum and adapted for connection to the vacuum-generating apparatus for generation of a vacuum within said plenum; and         a blocking surface within said plenum positioned adjacent to, but spaced at a distance from, the inner surface of the rim, said blocking surface partially blocking at least one but not all of said openings at said inner surface of said rim;

wherein said other sidewall at a periphery thereof is spaced from said rim to form a gap effective to avoid contact with said rim while preventing substantial loss of vacuum from said plenum.

12. The apparatus of claim 11, wherein said vacuum-generating device has a capacity to generate a vacuum of about 20 inches of water column or less within said plenum.

13. The apparatus of claim 11, wherein said vacuum-generating device has a capacity to generate a vacuum of about 10 inches of water column or more within said plenum.

\* \* \* \* \*

UNITED STATES PATENT AND TRADEMARK OFFICE
CERTIFICATE OF CORRECTION

PATENT NO.        : 8,006,826 B2                                Page 1 of 1
APPLICATION NO.   : 12/383662
DATED             : August 30, 2011
INVENTOR(S)       : Thomas Anthony Licht It is certified that error appears in the above-identified patent and that said Letters Patent is hereby corrected as shown below:

Title Page,
Item (73) Assignee:
Delete "Crown Packagin Technology, Inc.," and insert -- Crown Packaging Technology, Inc., --.

Signed and Sealed this
Thirtieth Day of October, 2012

David J. Kappos
*Director of the United States Patent and Trademark Office*